Patented June 14, 1932

1,863,321

UNITED STATES PATENT OFFICE

RALPH W. AUSTIN, OF WEYMOUTH, MASSACHUSETTS

FIRE EXTINGUISHER CHARGE

No Drawing. Application filed July 18, 1931. Serial No. 551,801.

This invention relates to a fire extinguisher charge and more particularly to the carbonate solution utilized in fire extinguishers for the generation of carbon dioxide for expelling the extinguishing liquid from the extinguisher.

The object of the invention is to provide a novel carbonate solution for use as a fire extinguisher charge, which possesses a freezing point of substantially $-40°$ F. and which may be made at a minimum expense and possesses no characteristics which render it undesirable for use in a fire extinguisher.

With this object in view and such others as may hereinafter appear, the invention consists in the carbonate solution hereinafter described and particularly defined in the claims at the end of this specification.

As is generally known, the ordinary soda and acid type of fire extinguisher is unsuitable for use under low temperature conditions. Various attempts have been made to provide a carbonate solution for use as a fire extinguisher charge of a character such that it might successfully withstand exposure to low temperatures without freezing. Attempts have been made to utilize sodium carbonate or bicarbonate in combination with other freezing point depressants, but as far as I am aware none of these compositions heretofore proposed embodying sodium carbonate or sodium bicarbonate have been successful in commercial use.

Attempts have also been made to utilize potassium carbonate in combination with freezing point depressants, but with the exception of the composition disclosed in my Patent No. 1,499,631 comprising potassium carbonate with potassium hydroxide as a freezing point depressant, none of the attempts to utilize potassium carbonate as an anti-freezing carbonate solution capable of withstanding temperatures of substantially $-40°$ F. have proved successful.

It has been generally recognized that a potassium carbonate solution is incapable of withstanding temperatures lower than $-36.5°$ C. Seidell gives the following figures upon the solubility of potassium carbonate.

*Potassium carbonate*

| t°.C. | Gms. K$_2$CO$_3$ per 100 gms. sat. solution |
|---|---|
| $-10$ | 21.3 |
| $-20$ | 31 |
| $-30$ | 36.9 |
| $-36.5$ | 39.6 |
| $-6.8$ | 50.9 |
| 0 | 51.3 |
| $-10$ | 52 |
| 20 | 52.5 |
| 25 | 52.8 |
| 30 | 53.2 |

I have discovered, however, that a satisfactory carbonate solution possessing the capability of successfully withstanding temperatures of substantially $-40°$ F. without freezing, may be obtained by utilizing so-called "commercial" or "technical grade" potassium carbonate in a water solution thereof of such concentration of carbonate as to impart to the solution a gravity of above 1.400. Experimental data has established that solutions of this so-called "commercial" or "technical" potassium carbonate above such gravity are capable of withstanding temperatures of $-40°$ F. and lower.

In making up a charge for a fire extinguisher it is preferred to dissolve the so-called "commercial" or "technical" potassium carbonate in water to bring the gravity of the solution to as near 1.465 as is practical. The amount of the commercial potassium carbonate that will be found necessary depends upon the moisture content of the same, and in making up a standard charge I have found that between twelve and twelve and one-half pounds of the commercial potassium carbonate technically known as 98% pure, will, when dissolved in substantially one and three-fourth gallons of water, produce the solution of the desired gravity. By the terms "technical" or "commercial" potassium carbonate, as used throughout this specification and throughout the claims, I intend to define those different grades of potassium carbonate which are commercially sold under a grading of 96–98%; 99–99½%; and 99–100% as well as the hydrated potassium carbonate 83–85% and which in fact when dehydrated would contain approximately 98–

99% potassium carbonate, and typical analyses of which are stated by various manufacturers to be as follows:

*Innis, Speiden & Company, New York city*

| 96–98% calc. | | 99–100% | | Hydrated | |
|---|---|---|---|---|---|
| $K_2CO_3$ | 97.42 | $K_2CO_3$ | 99.12 | $K_2CO_3$ | 83.87 |
| $Na_2CO_3$ | 0.08 | $Na_2CO_3$ | 0.45 | $Na_2CO_3$ | 0.34 |
| $H_2O$ | 1.60 | KCl | 0.18 | $K_2SO_4$ | 0.01 |
| KCl | 0.84 | $K_2SO_4$ | 0.09 | KCl | 0.07 |
| $K_2SO_4$ | 0.06 | $H_2O$ | 0.15 | $H_2O$ | 15.71 |
| | | Undetermined | .01 | | |

*The Harshaw Chemical Company, Philadelphia, Pa.*

| | Calcined 96/98% | Hydrated 83/85% |
|---|---|---|
| Potash carbonate | 97.59 | 83.49 |
| Sodium carbonate | 0.39 | 0.38 |
| Potash sulphate | 0.27 | 0.03 |
| Potash chloride | 0.53 | 0.08 |
| Moisture | 1.22 | 16.02 |
| Insoluble | 0.00 | 0.00 |

*J. T. Baker Chemical Co., Phillipsburg, N. J.*

| | Per cent |
|---|---|
| $K_2CO_3$ | 99.56 |
| CaO | .03 |
| $Al_2O_3$ | .001 |
| Fe | .004 |
| $SiO_2$ | .001 |
| Cl | .1 |
| $SO_3$ | .3 |

*Raffi & Swanson, Inc., Chelsea, Mass*

| | 90/92% | 96/98% | 99/99½% Refined | 99/100% C. P. | 83/85% Hydrated |
|---|---|---|---|---|---|
| $K_2CO_3$ | 91.66 | 97.61 | 99.30 | 99.00 | 83.45 |
| $Na_2CO_3$ | 2.19 | .84 | | | |
| KCl | 1.98 | .49 | .05 | | .03 |
| $K_2SO_4$ | 3.49 | .10 | | | |
| $H_2O$ | .68 | .96 | .65 | 1.00 | 16.52 |
| | 100.00 | 100.00 | 100.00 | 100.00 | 100.00 |

*Roessler & Hasslacher Chemical Co., Boston, Mass.*

| | Per cent |
|---|---|
| Carbonate potash | 97.12 |
| Carbonate soda | .45 |
| Chloride potash | .12 |
| Sulphate potash | .11 |
| Water | 2.19 |
| Undetermined | .01 |
| | 100.00 |

It will therefore be understood that the terms "technical" or "commercial" potassium carbonate define and include commercial potassium carbonate of the analyses above set forth and those other commercial potassium carbonates of substantially the same analysis.

The present extinguisher charge may be successfully used instead of the ordinary carbonate solution used in the ordinary soda and acid type of extinguisher, requires no special form of container for holding the same, and may be produced at a minimum expense. Experimental work has demonstrated that this carbonate solution produced from commercial potassium carbonate without the aid of other freezing point depressants operates very satisfactorily when the extinguisher is discharged under temperature conditions as low as $-40°$ F.

In addition the relatively high proportion of carbonate in the foregoing charge contributes to the efficiency of an extinguisher employing the charge in putting out fires.

This application is a continuation in part of my prior application Serial No. 250,712, filed Jan. 30, 1928, for Fire extinguisher charge.

Having thus described the invention what is claimed is:—

1. In a fire extinguisher, a carbonate solution capable of withstanding a temperature as low as $-40°$ F., comprising a solution of so-called "technical" potassium carbonate, in sufficient amount to impart to the solution a gravity of at least 1.400.

2. In a fire extinguisher, a carbonate solution capable of withstanding a temperature as low as $-40°$ F., comprising a solution of so-called "technical" potassium carbonate, in sufficient amount to impart to the solution a gravity of substantially 1.465.

In testimony whereof I have signed my name to this specification.

RALPH W. AUSTIN.